United States Patent
Leng et al.

(10) Patent No.: US 10,663,987 B2
(45) Date of Patent: May 26, 2020

(54) PRESSURE REGULATOR

(71) Applicant: The West Group Limited, Hampshire (GB)

(72) Inventors: John Leslie Leng, Hampshire (GB); Adrian John Meagher, Hampshire (GB)

(73) Assignee: THE WEST GROUP LIMITED, Hampshire (GB)

( * ) Notice: Subject to any disclaimer, the term of this patent is extended or adjusted under 35 U.S.C. 154(b) by 0 days.

(21) Appl. No.: 15/802,959

(22) Filed: Nov. 3, 2017

(65) Prior Publication Data

US 2018/0052474 A1 Feb. 22, 2018

Related U.S. Application Data

(63) Continuation-in-part of application No. 15/045,520, filed on Feb. 17, 2016, now abandoned.

(30) Foreign Application Priority Data

Feb. 20, 2015 (GB) .................................. 1502896.2

(51) Int. Cl.
  *G05D 16/06* (2006.01)
  *G05D 16/02* (2006.01)
  *F16K 1/32* (2006.01)
(52) U.S. Cl.
  CPC ......... *G05D 16/0636* (2013.01); *G05D 16/02* (2013.01); *G05D 16/0666* (2013.01); *F16K 1/32* (2013.01)
(58) Field of Classification Search
  CPC ....... F16K 1/32; G05D 16/0666; G05D 16/02
  See application file for complete search history.

(56) References Cited

U.S. PATENT DOCUMENTS 2,237,554 A * 4/1941 Grove ..................... F16K 25/04
  251/122
2,359,111 A 9/1944 Hughes
  (Continued)

FOREIGN PATENT DOCUMENTS

DE  297 08 831 U1  9/1997
EP  0095353 A1  11/1983
  (Continued)

OTHER PUBLICATIONS

Non-Final Rejection for corresponding U.S. Appl. No. 15/045,513, dated Feb. 21, 2017, 14 pages.
  (Continued)

*Primary Examiner* — Kevin F Murphy
*Assistant Examiner* — Patrick C Williams
(74) *Attorney, Agent, or Firm* — Westman, Champlin & Koehler, P.A.

(57) ABSTRACT

A pressure regulator, said pressure regulator comprising a housing containing a channel arranged to communicate a fluid from a fluid inlet to a fluid outlet, said channel comprising a valve seat housing, a valve seat and closure member with said closure member operable with the valve seat and valve seat housing to control flow through the channel; wherein the housing comprises a resilient diaphragm in fluid communication with the fluid and in physical communication with the closure member such that the diaphragm is operable to deform in response to a change in pressure of the fluid and such that deformation of the diaphragm causes the closure member to change position, and; wherein the section of the diaphragm not in fluid communication with the channel, is in fluid communication with the exterior of the regulator via a vent aperture and; wherein the closure member comprises an upstream valve element and downstream valve element, wherein the down- (Continued)

stream valve element is a ridge operable with an aperture in the valve seat housing to at least partially control fluid flow, wherein said ridge of the closure member is partially or fully inside said aperture in the valve seat housing when the upstream valve element of the closure member is at or between the fully open position and a predetermined partially open position with the valve seat, to provide a restriction to fluid flow but not to fully obstruct flow.

17 Claims, 6 Drawing Sheets

(56) References Cited

U.S. PATENT DOCUMENTS

| | | | |
|---|---|---|---|
| 2,568,114 A * | 9/1951 | Cornelius | B67D 1/14 137/334 |
| 2,837,241 A | 6/1958 | Griswold | |
| 2,941,543 A | 6/1960 | Kleczek | |
| 3,086,548 A | 4/1963 | Galiger et al. | |
| 4,004,715 A * | 1/1977 | Williams | B67D 1/1234 222/30 |
| 4,302,178 A * | 11/1981 | Belknap | G05D 16/0672 137/100 |
| 6,073,649 A | 6/2000 | Somorov | |
| 6,079,434 A | 6/2000 | Reid et al. | |
| 6,758,238 B2 | 7/2004 | Callies | |
| 7,165,573 B2 | 1/2007 | Gotthelf | |
| 8,459,288 B2 * | 6/2013 | Ishikawa | G05D 16/163 137/15.19 |
| 2005/0263189 A1 | 12/2005 | Nakamura | |
| 2007/0056635 A1 | 3/2007 | Elberson et al. | |
| 2010/0147400 A1 | 6/2010 | Hawkins et al. | |
| 2011/0174381 A1 | 7/2011 | Foust et al. | |

FOREIGN PATENT DOCUMENTS

| | | |
|---|---|---|
| FR | 2813174 A1 | 3/2002 |
| GB | 367 284 A | 2/1932 |
| GB | 563 208 A | 8/1944 |
| GB | 1 403 785 A | 8/1975 |
| GB | 2145929 A | 4/1985 |
| GB | 2 298 026 A | 8/1996 |
| GB | 2464283 A | 4/2010 |
| JP | 2000014519 A | 1/2000 |
| WO | 2012/161780 A1 | 11/2012 |

OTHER PUBLICATIONS

Non-Final Rejection for corresponding U.S. Appl. No. 15/045,520, dated Feb. 22, 2017, 12 pages.
Notification of European publication number and information on the application of Article 67(3) EPC, dated Sep. 21, 2016; and Communication, dated Sep. 16, 2016, including European search report, for European Patent Application No. 16153654.5, 4 pages.
Communication pursuant to Article 94(3) EPC for European Patent Application No. 16153654.5, dated Oct. 11, 2016, 4 pages.
Notification of European publication number and information on the application of Article 67(3) EPC, dated Sep. 21, 2016; and Communication, dated Sep. 19, 2016, including European search report, for European Patent Application No. 16153655.2, 4 pages.
Communication pursuant to Article 94(3) EPC for European Patent Application No. 16153655.2, dated Oct. 5, 2016, 5 pages.
Notification of European publication number and information on the application of Article 67(3) EPC, dated Sep. 21, 2016; and Communication, dated Sep. 19, 2016, including European search report, for European Patent Application No. 16153656.0, 4 pages.
Communication pursuant to Article 94(3) EPC for European Patent Application No. 16153656.0, dated Oct. 11, 2016, 5 pages.
Combined Search and Examination Report under Sections 17 and 18(3) for GB Patent Application No. 1502896.2, dated Sep. 22, 2015, 7 pages.
Final Office Action from U.S. Appl. No. 15/045,513, dated Aug. 3, 2017, 12 pages.
Final Office Action from U.S. Appl. No. 15/045,520, dated Aug. 3, 2017, 12 pages.
Final Office Action from U.S. Appl. No. 15/045,508, dated Aug. 4, 2017, 11 pages.
Office Action from U.S. Appl. No. 15/045,508, dated Feb. 17, 2017, 11 pages.

* cited by examiner

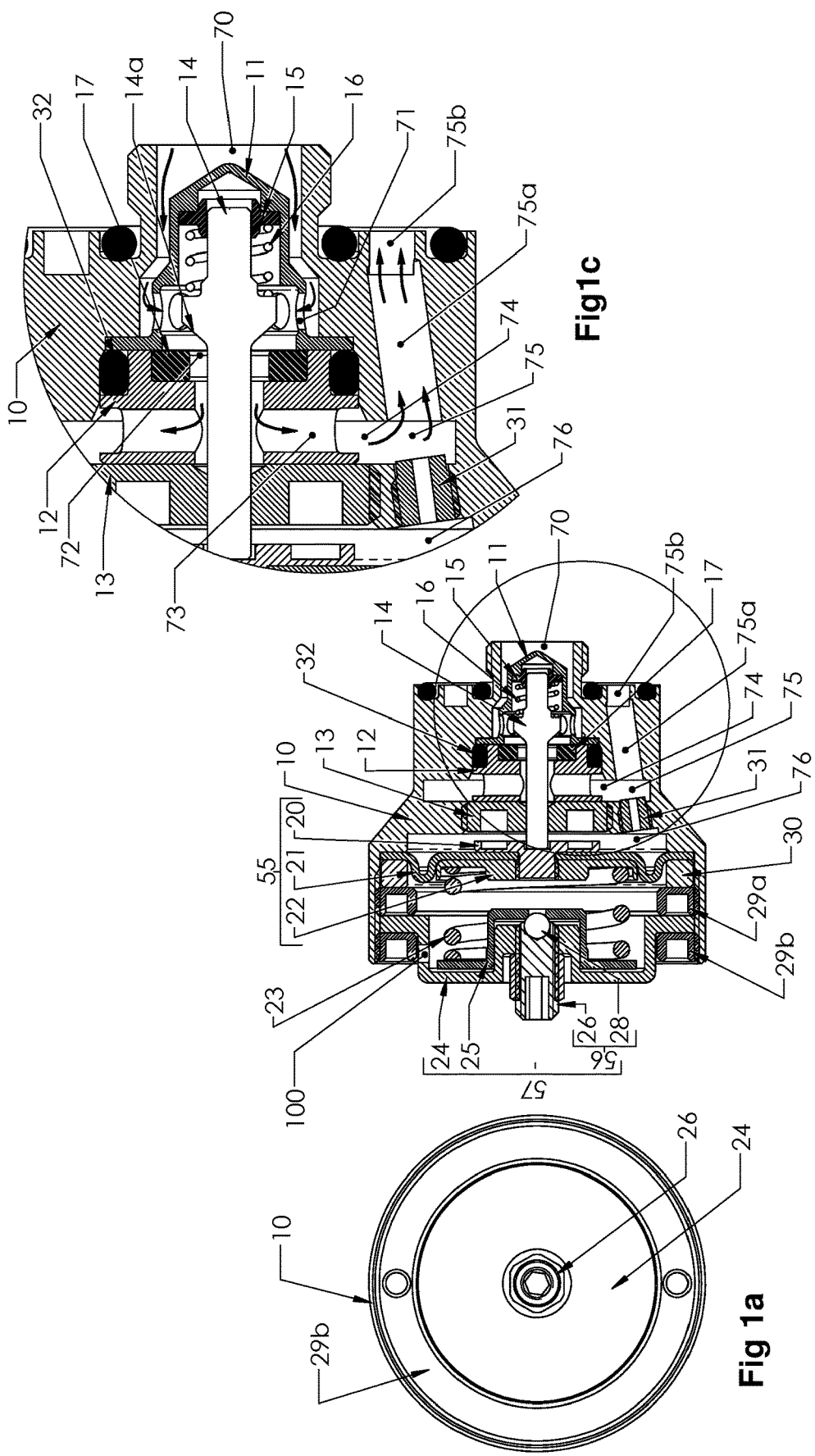

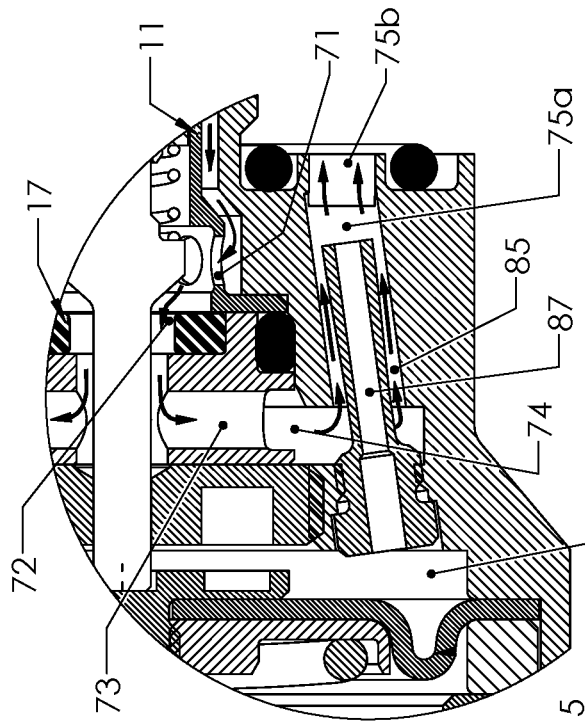
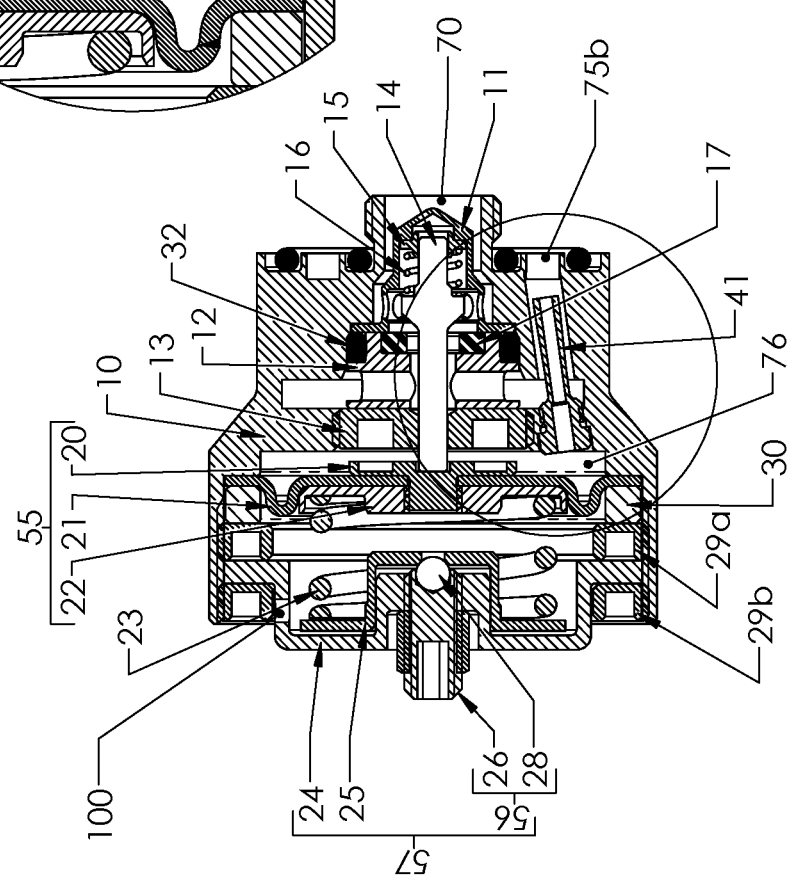
Fig 2b
Fig 2a

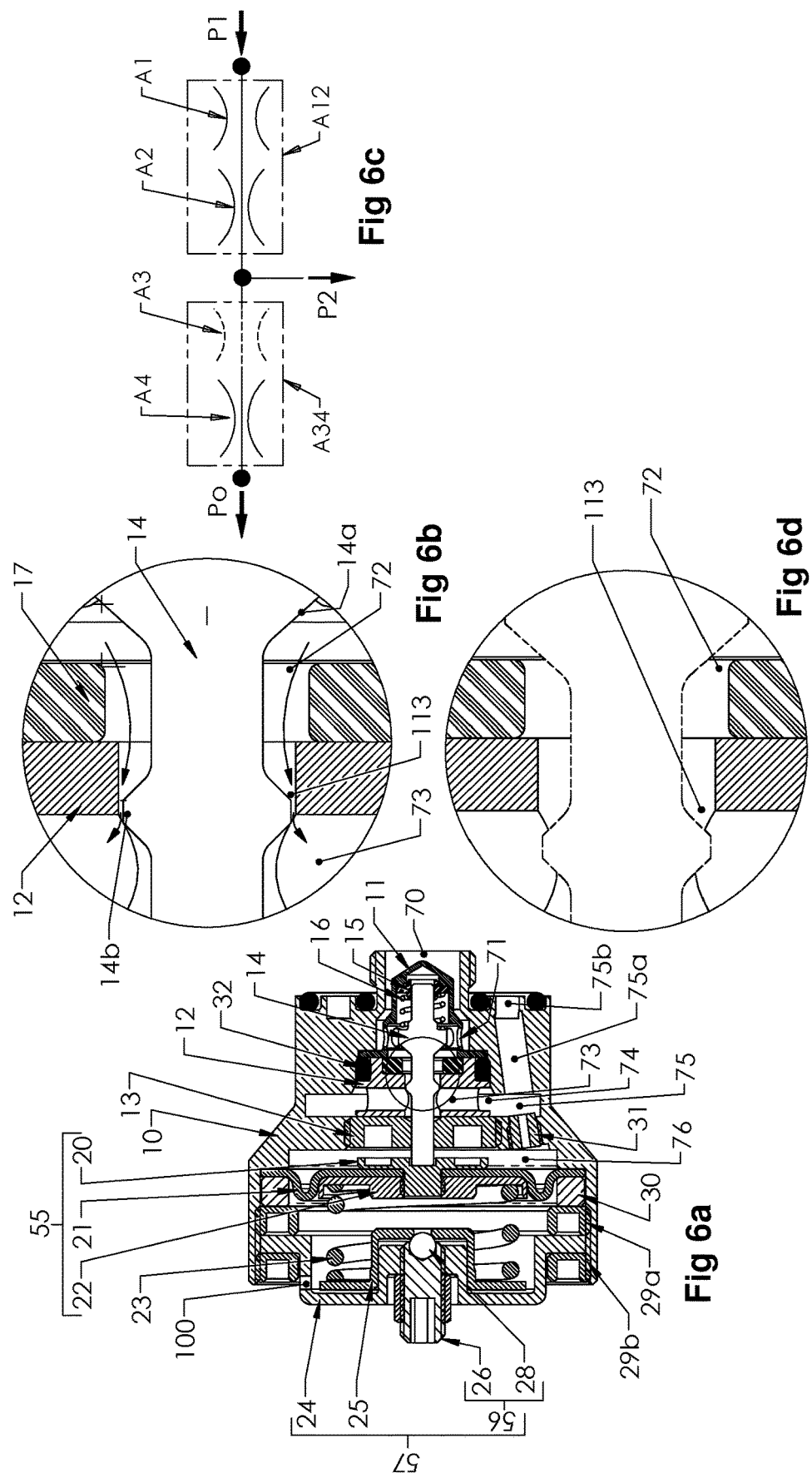

PRESSURE REGULATOR

CROSS-REFERENCE TO RELATED APPLICATIONS

This application is a continuation-in-part of U.S. application Ser. No. 15/045,520, filed on Feb. 17, 2016, which claims priority to Great Britain Application No. 1502896.2, filed on Feb. 20, 2015, the contents of which are hereby incorporated by reference.

FIELD

This invention relates to a pressure regulator for controlling fluid pressure. Particularly, but not exclusively, the invention pertains to miniature pressure regulators for medical devices.

BACKGROUND

Pressure regulators for use in medical devices such as a gas delivery system often require high accuracy of the regulated output pressure. In recent years there has been a move towards miniaturisation and weight reduction of medical devices including devices using pressure regulators to allow for increased convenience and portability. Accordingly there have been attempts to produce miniature pressure regulators to satisfy these size and weight requirements including single stage regulators for use with supply pressures of typically 4-10 bar, producing a reduced regulated output pressure. Such single stage miniature pressure regulators may also have applicability in scientific equipment and high precision industrial machinery.

"Pressure droop" is a characteristic seen in known regulators whereby the pressure at the regulator outlet falls, deviating away from the set point pressure as the flow rate through the regulator is increased.

In seeking to reduce the size of pressure regulators the size often has to be compromised to achieve the required regulator performance particularly for increased flow capacity and the reduction of outlet "pressure droop"—typically by increasing the size of regulator to achieve the performance requirement. Another problem in known pressure regulators is: if a significant leak path occurs in the regulator diaphragm, the outlet fluid pressure is likely to increase to a level well above the set outlet pressure. The present invention seeks to provide a solution to one or more of these problems.

SUMMARY

According to the present invention there is provided a pressure regulator, said pressure regulator comprising a housing containing a channel arranged to communicate a fluid from a fluid inlet to a fluid outlet, said channel comprising a valve seat housing, a valve seat and closure member with said closure member operable with the valve seat and valve seat housing to control flow through the channel; wherein the housing comprises a resilient diaphragm in fluid communication with the fluid and in physical communication with the closure member such that the diaphragm is operable to deform in response to a change in pressure of the fluid and such that deformation of the diaphragm causes the closure member to change position, and; wherein the section of the diaphragm not in fluid communication with the channel, is in fluid communication with the exterior of the regulator via a vent aperture and; wherein the closure member comprises an upstream valve element and downstream valve element, wherein the downstream valve element is a ridge operable with an aperture in the valve seat housing to at least partially control fluid flow, wherein said ridge of the closure member is partially or fully inside said aperture in the valve seat housing when the upstream valve element of the closure member is at or between the fully open position and a predetermined partially open position with the valve seat, to provide a restriction to fluid flow but not to fully obstruct flow.

Preferably the downstream valve element of the closure member provides a partial restriction to flow when the upstream valve element of the closure member is at or at between approximately 60% of fully open position and the 100% fully open position (fully open).

Preferably, the exterior of the said pressure regulator is in communication with the side of the diaphragm that is not wetted by the fluid being controlled by the regulator via a vent aperture in the diaphragm enclosure attached to the regulator housing with a cross sectional area "A". The said vent aperture is dimensioned to provide said area "A" that is equivalent to an orifice that can pass the full rated fluid flow of the regulator with a pressure differential across said orifice not exceeding 0.5 bar.

Thus, in the event of a diaphragm failure whereby a leak path occurs in the diaphragm such that the movement of the diaphragm along the movement axis of the closure member is not obstructed, the regulator will limit pressure at the fluid outlet in one of three modes:— a) For of a small leak path (leak path area less than approximately 50% of vent aperture area "A") through the diaphragm the regulator will behave substantially as for a healthy diaphragm—with the diaphragm movement causing the upstream valve element of the closure member to regulate outlet pressure but with reduced accuracy.

b) For a large leak path (larger than approximately 150% of the vent aperture area "A") the pressure at the fluid outlet will be substantially limited by the restriction between the downstream valve element of the closure member and an aperture in the valve seat housing, the said downstream valve element being partially or fully inside said aperture as the partial loss of effective diaphragm area and also continual fluid leakage to the exterior causes movement of closure member such that the upstream valve element of the closure member is in the 60-100% open region. The clearance between the downstream valve element of the closure member and the aperture of the valve seat housing provides restriction to fluid flow.

c) For a diaphragm leak size between the conditions described above in a) and b) the mode of outlet port pressure regulation may transition between condition a) and condition b).

The use of a valve closure member, a valve seat and valve seat housing to provide two valve elements, wherein each valve element provides the dominant restriction and control of fluid flow over different portions of the closure member stroke and therefore the diaphragm stroke, is a low cost and compact method of limiting outlet port pressure in the event of a leak path occurring in the diaphragm where the diaphragm movement along the movement axis of the closure member is not obstructed.

The downstream valve element of the closure member and the valve seat housing aperture can be dimensioned to obtain a predetermined maximum pressure limit of the fluid outlet required in the event of a "large" leak path in the diaphragm occurring (as described above), the said downstream valve element being active when the closure member moves to the 60%-100% stroke position. For example if the fluid outlet maximum pressure limit required is 50% of the regulator fluid inlet pressure then the effective restriction area between the downstream valve element of closure member and the valve seat housing aperture will need to be approximately equal to the area of the vent aperture area "A."

If the outlet maximum pressure limit required is 20% of the inlet pressure then the effective restriction area between the downstream valve element of the closure member and the aperture of the valve seat housing will need to be approximately 50% of the vent aperture area "A."

This aspect of the invention for limiting fluid outlet pressure in the event of a large leak path occurring in diaphragm is applicable to components being dimensioned to limit the outlet port pressure to a proportion of the difference between regulator inlet pressure and the exterior pressure: within the range of preferably 20% to 80%.

Beneficially, the pressure regulator comprises a deflection member located in the channel that is arranged to deflect fluid flowing in downstream direction in the channel such that the closure member is shielded to substantially prevent fluid flow that is generally parallel with the movement axis of the closure member, from impinging on surfaces of the closure member that are upstream of the valve seat.

Preferably, the deflection member deflects fluid around the closure member such that fluid is directed to the valve seat via apertures or slots in the deflection member in a generally symmetric manner in a plane substantially perpendicular to the movement axis of the closure member. By this approach, the use of the deflection member to provide shielding, allows the magnitude of forces urging the closure member towards the valve seat along the movement axis of the closure member to be reduced, thereby reducing the outlet pressure droop. This reduction in pressure droop in turn allows the flow capacity of the pressure regulator to be increased.

The use of such a deflection member allows for a compact configuration of pressure regulator. The structural approach of providing a deflection member in this way facilitates a low-cost manufacturing approach while providing reduction of outlet pressure droop.

In some examples, the movement axis of the closure member may be substantially coaxial with the fluid inlet. Additionally or alternatively, the deflection member may be located in the channel proximate to the fluid inlet. Such a configuration allows for a compact configuration of pressure regulator.

Beneficially, the pressure regulator further comprises a hollow member located in the channel and the stem of said hollow member defines a narrow path between the stem and the channel in a region proximate to the fluid outlet, such that fluid passing through the channel is communicated from the fluid inlet to the fluid outlet via said narrow path. The outside profile of the stem of the hollow member may be one of several forms—it may have a portion which is generally tapered or curved to provide a gradual reduction in the cross-sectional area of the narrow path between the outside of the stem and the channel or it may have a cylindrical portion. The Venturi effect of fluid moving at a higher velocity through the narrow path between the stem of the hollow member and the channel then entering the slower moving fluid in the channel towards the fluid outlet results in reduced pressure which is transferred to the diaphragm via the inside passage in the hollow member.

This approach, of the diaphragm sensing the reduced pressure produced by the Venturi effect of flow exiting the narrow path formed between the stem of the hollow member and the channel, helps to partially compensate for fluid pressure drop through the regulator between the downstream side of the valve seat and the regulator outlet wherein the communication of the said reduced pressure to the diaphragm urges movement of the diaphragm in the direction that tends to increase the opening between the closure member and valve seat, thereby reducing outlet pressure droop. The provision of the hollow member has proved satisfactory in reducing regulator outlet pressure droop. This reduction of pressure droop in turn allows the flow capacity of the pressure regulator to be increased. Furthermore, sampling the pressure near to the fluid outlet with the sensing end of the stem of the hollow member at or near to the centre region of the outlet channel cross-section, allows a fast response of the pressure regulator to be obtained in response to changes in the regulator fluid inlet pressure or change in flow to the fluid outlet.

It has been found that the use of such a hollow member in the configuration described provides a regulator with good or low hysteresis and good repeatability of outlet fluid pressure.

Furthermore, the use of such a hollow member allows for a compact configuration of pressure regulator. The structural approach of providing a hollow member in this way facilitates a low-cost manufacturing approach while providing reduction of outlet pressure droop.

In some examples, the longitudinal axis of the hollow member may be substantially parallel with the axis of movement of the regulator closure member.

Alternatively, the longitudinal axis of the hollow member may be substantially perpendicular to the axis of movement of the closure member. Such a configuration allows for a compact configuration of pressure regulator, as well as allowing for simplified assembly. In some examples, the regulator may comprise a plurality of hollow members. The use of multiple hollow members enables increased flow through the regulator—provided that the flow capacity is not limited by other limiting flow areas in the flow path through the regulator.

In some examples, the closure member maybe an elongate element. Such a structure allows the closure member to be in physical communication with the diaphragm element in a simplified manner while at the same time being operable to open and close the channel.

In some examples, the fluid inlet may be substantially parallel to the fluid outlet.

Alternatively, the fluid inlet may be substantially perpendicular to the fluid outlet. Such a configuration allows for a compact configuration of pressure regulator.

In some examples, the regulator may comprise a bias spring to bias the closure member into abutting the diaphragm. Such a structure allows the closure member to remain in physical communication with the diaphragm and to apply a force to the diaphragm. Furthermore such a configuration allows for physical contact to be maintained in a manner which simplifies manufacture and/or assembly.

In some examples, the closure member may be fixedly attached to the diaphragm. Such a configuration allows the closure member to remain in physical communication with the diaphragm and allows the application of a bias force to the closure member acting towards the diaphragm to be avoided. In some examples, the closure member may be removably attached to the diaphragm. Such a configuration allows the closure member to remain in physical communication with the diaphragm and allows the application of a bias force to the closure member acting towards the diaphragm to be avoided. Furthermore such a configuration allows the removability of the closure member such that it can be replaced for repair.

In some examples, the diaphragm may be biased by a force acting on the diaphragm by a diaphragm load spring to urge the diaphragm and therefore the closure member towards a position that provides an opening between the closure member and the valve seat. Such a structure allows a force to be applied to the diaphragm through the selection of the spring stiffness and length and the magnitude of spring compression.

In some examples, the regulator may comprise an adjustment mechanism which is operable to adjust the compression of the diaphragm load spring such that the force acting on the diaphragm by the diaphragm load spring can be varied. Such a structure allows for an end user to adjust the fluid output pressure.

In some examples, a section of the diaphragm which is not in fluid communication with the channel may have a fluid communication path to the exterior of the pressure regulator to the exterior environment. Such a structure allows for fluid pressure on the channel side of the diaphragm to be referenced to the exterior pressure. In some examples, the pressure of a pressurised control fluid acting on the side of the diaphragm which is not in contact with the channel may be adjusted to vary the force of the pressurised control fluid acting on the diaphragm. Such a configuration allows an end user to adjust the regulator fluid outlet pressure.

In some examples, the fluid pressure at the fluid outlet may be determined by a net spring force acting on the diaphragm. Such a configuration allows for the fluid outlet pressure to be predetermined in a simplified manner without the need for elements other than the diaphragm and those producing a force on the diaphragm to be adjusted.

In some examples, the net force acting on the closure member may comprise two or more forces selected from the group comprising: the restoring force of the resilient diaphragm itself; a force applied through the closure member by the bias spring; the force applied by the diaphragm load spring; and the force applied by a pressurised control fluid. Such a configuration allows for the pressure regulator to be adjusted by adjusting the force acting on the diaphragm from one or more of the elements making up the net force. Furthermore such a configuration allows for pressure regulators to be used for a wide range of applications.

In some examples, the pressure regulator may be a non-relieving pressure regulator. Such a configuration allows for fluid wastage to be reduced and allows for the release of potentially dangerous fluids to be reduced.

In some examples, the pressure regulator may be a relieving pressure regulator. Such a configuration allows the relief of excess pressure above a set point in the event of induced pressure from a system or device connected to the regulator outlet In some examples, the wetted components of the pressure regulator may be suitable for use with medical gases. Such a configuration allows such pressure regulators to be used for a wide range of applications, in particular for use in medical applications.

Some examples provide a multi-stage pressure regulator wherein at least one stage of the multi-stage pressure regulator is a regulator according to the invention.

BRIEF DESCRIPTION OF DRAWINGS

Embodiments of the present invention will now be described in greater detail with reference to the accompanying drawing in which:

FIG. 1a shows an end view of a pressure regulator;

FIG. 1b shows a lengthwise cross-section through the pressure regulator shown in FIG. 1a;

FIG. 1c shows an enlarged portion of the cross-section through the pressure regulator shown in FIG. 1b;

FIG. 2a shows a lengthwise cross-section through a pressure regulator;

FIG. 2b shows an enlarged portion of the cross-section through the pressure regulator shown in FIG. 2a;

FIG. 3b shows an enlarged portion of the cross-section through the pressure regulator shown in FIG. 3a;

FIG. 3c shows an end view of the pressure regulator shown in FIG. 3a;

FIG. 3e shows a lengthwise view of the pressure regulator shown in FIG. 3a;

FIG. 6a shows a lengthwise cross-section through a pressure regulator;

FIG. 6b shows an enlarged portion of the cross-section through the pressure regulator shown in FIG. 6a showing the closure member in 65% stroke position;

FIG. 6c shows a schematic diagram of the equivalent circuit for the pressure regulator in FIG. 6a-except with a large leak path to the exterior via the diaphragm and vent aperture; and FIG. 6d shows an enlarged portion of the cross-section through the pressure regulator shown in FIG. 6a showing the closure member in approximately the "maximum" regulator flow rate position.

Figure 3A:
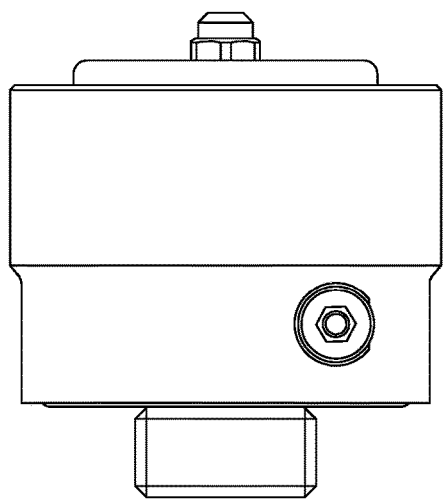
FIG. 3a shows a lengthwise cross-section through the pressure regulator shown in FIG. 3c.
Figure 3C:
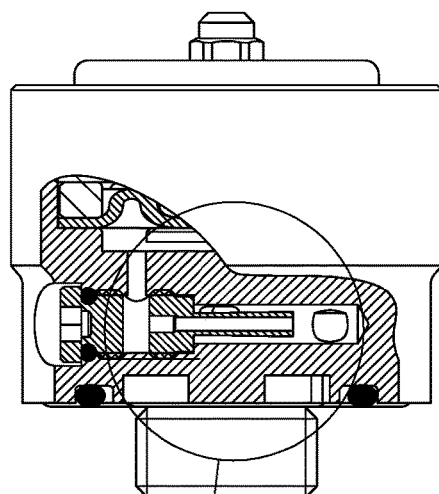
Figure 3E:
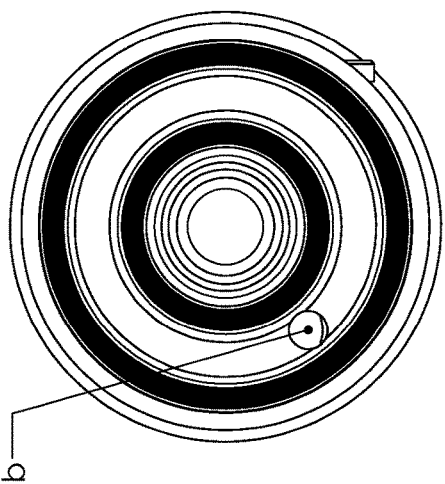
Figure 3B:
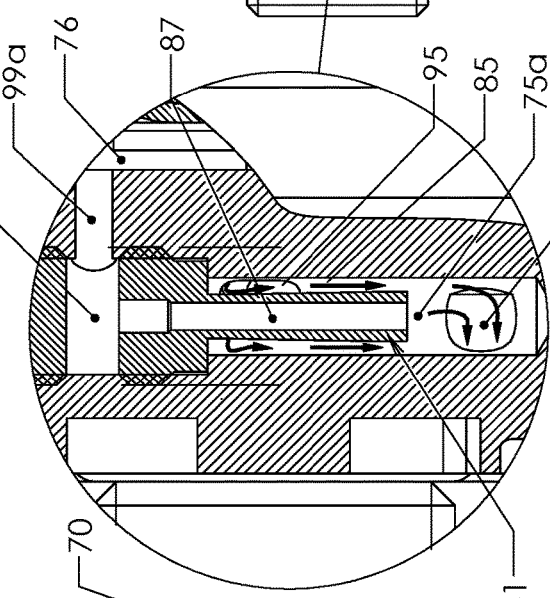
Figure 3D:
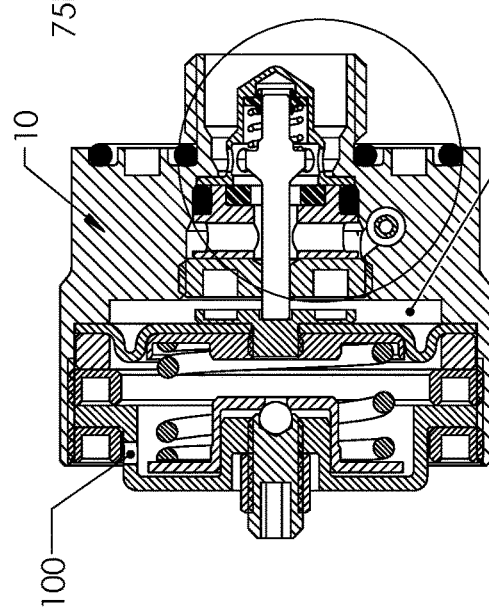
FIG. 3d shows an enlarged portion of the cross-section through the pressure regulator shown in FIG. 3f.
Figure 3F:
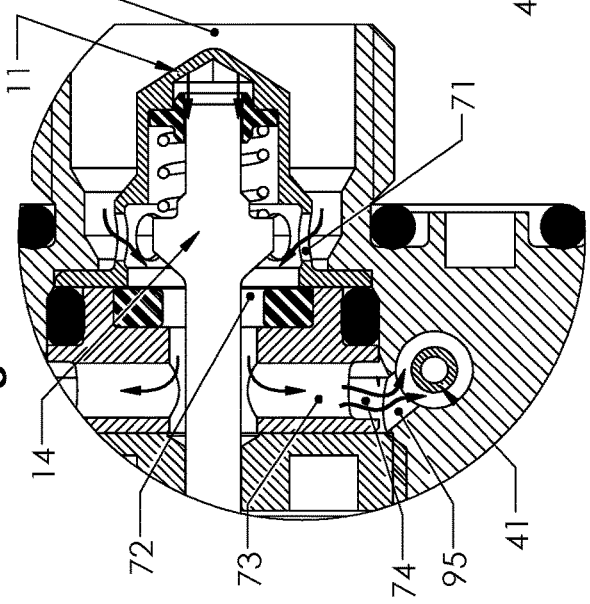
FIG. 3f shows a lengthwise partial cross-section through the pressure regulator shown in FIG. 3e.

While the invention is susceptible to various modifications and alternative forms, specific embodiments are shown by way of example in the drawings and are herein described in detail. It should be understood however that the drawings and detailed description attached hereto are not intended to limit the invention to the particular form disclosed, but rather the invention is to cover all modifications, equivalents and alternatives falling within the scope of the appended claims.

DETAILED DESCRIPTION

A pressure regulator is illustrated in FIGS. 1a-1c. The pressure regulator shown in FIGS. 1a-1c has a main body 10, into which is assembled a valve structure that includes a movable closure member 14 (also known, for example, as a valve poppet), a valve seat 17 and a valve seat housing 12. The valve seat housing 12 is dimensioned to receive valve seat 17 which in the present example is an elastomeric flat disc with an aperture. The closure member 14 is movable under action of the regulator mechanism described below to move along a movement axis so as to in one position cause obstruction of a fluid path and in other positions provide restriction to the fluid path.

To allow the fluid path to be opened, the closure member 14 is moved to a position where a gap is provided between the aperture of the valve seat 17 and the closure member 14 such that the fluid path is open.

In the structure illustrated in FIGS. 1a-1c, the closure member 14 is assembled into the pressure regulator by way of being inserted into a receiving structure of the main body 10 along with a closure member housing 11, a bearing 15, a bias spring 16, the closure member 14, the valve seat 17, a valve seat housing 12, and a retainer 13. The bore in the retainer 13 and the bore in the bearing 15 are dimensioned to slidably receive the closure member to provide guidance for the closure member along an axis coaxial with the valve seat and valve seat housing. The bias spring 16 registers against a shoulder on the closure member 14 and against a shoulder on the bearing 15 to provide an urging or biasing force acting on the closure member 14 towards the valve seat 17. The retainer 13 has a threaded portion that engages with the main body 10 and is torque tightened to secure the valve seat housing 12, the valve seat 17, the closure member 14, the bias spring 16, the bearing 15 and the O ring seal 32 in position in the main body 10. The structure of the main body 10 together with the retainer 13 and the orifice plug 31 provides a partition between the main fluid path and the diaphragm. The chamber between the said partition and diaphragm is referred to as the diaphragm chamber 76. Fluid communication between the main fluid path of the regulator and the diaphragm chamber is provided by the orifice in the orifice plug 31 and also the significantly smaller fluid connection provided by the clearance between the closure member 14 and the bore of retainer 13. The closure member housing or deflection member 11 is shaped so as to cause fluid to be deflected around the closure member housing 11 and to enter the inside of the closure member housing 11 into the region where the closure member 14 engages with the valve seat 17, via apertures or slots 71 in the closure member housing 11, in a plane substantially perpendicular to the movement axis of closure member 14.

In the arrangement illustrated in FIGS. 1b and 1c, the closure member 14 has a conical portion which is referred to as ridge 14a. The presence of the ridge 14a allows an opening between the closure member 14 and the valve seat 17 to be at or between fully open and closed positions by movement of the closure member 14 along its movement axis. Movement of the ridge 14a to a closed position will close a fluid path through the regulator and movement of the ridge 14a away from such a closed position will open the fluid path through the regulator. The arrangement of these assembled elements is shown in FIG. 1b and in an enlarged view in FIG. 1c.

The diaphragm in the present example 21 is formed from a flexible or resilient material such as a moulded elastomer. The diaphragm 21 can be preassembled so as to be sandwiched between a stud 20 and a spring cup 22 by torque tightening the stud 20 into the spring cup 22 to form a diaphragm subassembly 55.

The diaphragm subassembly 55 is installed in the body 10 such that the stud 20 engages with the closure member 14. The engagement between the stud 20 and the closure member 14 is provided by locating the closure member 14 into a recess formed in the stud 20. In alternative arrangements, the closure member may be engaged with and/or retained to the stud 20 by providing a gripping engagement of some form, such as by using threaded engagement, barbed engagement or clip. The diaphragm assembly 55 is assembled into position using a non-threaded grip ring 30 which in turn has a clamp force applied thereto by torque tightening clamp ring 29a.

The illustrated arrangement uses a load spring 23 arranged to provide a biasing or load force to the closure member 14 acting counter to the bias spring 16 by application of force via the diaphragm subassembly 55 onto the closure member 14.

To provide an acting surface against which the load spring can act, and to provide for adjustment in the net load force according to the present example, a spring guide 25 is fitted to an internal spigot in an adjuster housing 24 which is itself mounted to the main body 10. The fit between the spring guide 25 and the spigot of the adjuster housing 24 is a close clearance fit to provide for smooth, unrestricted movement of the spring guide 25 over the spigot. The load spring 23 is installed between the spring guide 25 and the spring cup 22. An adjuster 26 is threadedly received through an opening in the end of the spigot of the adjuster housing 24. A ball 28 is received into a hole on the end of the adjuster 26 using an interference fit to form an adjuster and ball subassembly 56. The adjuster and ball subassembly 56 can be wound in and out along the threaded engagement between the adjuster 26 and the spigot to provide for adjustment in the compression of the load spring 23 by causing movement of the spring guide 25.

An adjuster subassembly comprises the adjuster housing 24, a spring guide 25 and the adjuster and ball subassembly 56. The adjuster subassembly 57 is assembled into the main body 10 and the adjuster housing 24 is held in place into the receiving structure of the main body 10 by a torque tightened clamp ring 29b.

As illustrated, the load spring 23 side of the diaphragm 21 is vented to exterior pressure via a vent hole 100 in the adjuster housing 24. The bias spring 16 urges the closure member 14 towards the diaphragm stud 20 thereby obtaining physical communication with diaphragm subassembly. The net spring force acting on the diaphragm is the load spring 23 force minus the bias spring force provided by spring 16.

The fluid flow through the pressure regulator illustrated in FIGS. 1a to 1c will now be discussed. In use, a fluid enters the pressure regulator from a fluid source connected to the regulator at fluid inlet 70. The fluid path is deflected around the closure member housing 11. The upstream end of the closure member housing 11, which is directed towards the incoming fluid proximate to the inlet of regulator has, in the present example, a conical shape. In other examples, the end of the closure member housing 11 may have a domed shape, a frusto-conical shape or a flat profile with chamfers or the like. The fluid path then passes between the annulus formed by the bore (receiving structure) of main body 10 and the closure member housing 11 and into the chamber inside the closure member housing 11 through radial holes or slots 71 in the closure member housing 11.

To set the pressure regulator with the desired outlet pressure set below the pressure of fluid supplied to the regulator inlet; the set screw 26 is adjusted to obtain a net load force acting on the closure member 14 via the load spring 23 and diaphragm subassembly 55 which urges the valve closure member 14 to provide an opening 72 with the valve seat 17 and to allow fluid to flow from the inside of the deflection member 11 through to the radial holes or slots 73 in the valve seat housing 12, into the gallery 74, then to position 75, then into a passage 75a connecting to the fluid outlet 75b. Pressure feedback to the diaphragm chamber 76 is substantially provided by communication of fluid pressure from the fluid path at position 75 near the entry to the outlet passage 75a to the diaphragm chamber via the aperture in orifice plug 31. Fluid pressure in the diaphragm chamber 76 will increase until the force applied by fluid pressure and the closure member 14 acting on the diaphragm subassembly 55 is sufficient to move the diaphragm subassembly 55 to a position towards the left hand side of FIG. 1b such that the total force applied towards the left balances with the net load force acting on the diaphragm towards the right. This balance position of the diaphragm subassembly, and therefore the closure member 14, occurs when the opening 72 between the closure member 14 and the valve seat 17 is of a size that provides the required reduction in fluid pressure from the inlet pressure to obtain a pressure acting on the diaphragm at which there is force balance with the net load force. The pressure regulator therefore operates depending upon the outlet pressure to open or close the opening 72 by movement of the closure member 14 such that the ridge 14a blocks or provides a variable restriction to the flow path through valve seat 17. The feedback pressure control enables the regulator to self-regulate to a set outlet pressure. The set outlet pressure can be adjusted using the adjuster 26 to vary the net load force acting on the diaphragm.

By providing the configuration shown in FIGS. 1a-1c and as discussed above, using a deflection member to avoid direct impingement of incoming fluid flow on the closure member in a direction substantially parallel with the movement axis of the closure member, a compact design of pressure regulator can be produced having a high maximum fluid flow throughput.

A variation of the regulator is illustrated in FIGS. 2a, 2b. The pressure regulator shown in FIGS. 2a and 2b has a main body 10 into which the component parts of the pressure regulator are assembled as for the example shown in FIGS. 1a-1c. The operation of the closure member housing 11, seat housing 12, retainer 13, closure member 14, bearing 15, bias spring 16, valve seat 17, diaphragm sub assembly 55, and adjuster subassembly 56, are similar to the corresponding arrangements described above with reference to FIGS. 1a-1c.

The main difference between the pressure regulator of this example and the regulator of the earlier example above is in the method and structure by which the diaphragm chamber senses the pressure of the fluid proximate to the regulator outlet. According to the arrangement shown in FIGS. 2a-b, a hollow member 41 is assembled to the main body 10 (in a similar location to the orifice plug in the example shown in FIG. 1b). The hollow member 41 is mounted in the wall between the diaphragm chamber 76 and the channel 75, with the stem of the hollow member 41 located in the transfer passage 75a. The hollow member 41 is assembled into the main body 10 by torque tightening a shouldered head of the hollow member 41 into a counterbore of a threaded hole in the main body 10, similar to the hole through which the orifice plug is fitted in the earlier example above.

As with the above arrangements shown in FIGS. 1a-1c, in-use, a fluid path through the regulator starts at fluid inlet 70, is deflected by the closure member housing 11 and passes between the annulus formed by the bore of main body 10 and the closure member housing 11. The fluid path enters into the chamber inside closure member housing 11 through radial holes or slots 71 in the closure member housing 11.

When the pressure regulator is, at least, partially open fluid passes through opening 72 provided by the valve seat 17 and the ridge 14a of the closure member 14. When the pressure regulator is fully closed, for example when the set pressure is set to zero fluid outlet pressure, opening 72 is closed off by valve seat 17 and the ridge 14a of closure member 14.

After passing through the opening 72, the fluid path emerges through radial holes or slots 73 disposed around the axis of the valve seat housing 12. The fluid flow through the plurality of radial holes/slots 73 in the valve seat housing 12 flows into the gallery 74 and exits the gallery through a passage 85 formed between the outside surface of the stem of hollow member 41 and a transfer passage 75a. Fluid exits the passage 85 to emerge into the transfer passage at 75a. The cross-sectional area of transfer passage 75a is larger than that of passage 85 resulting in higher velocity fluid entering slower velocity fluid at 75a with the associated reduction in pressure at 75a caused by the Venturi effect. The pressure at 75a is transferred to the diaphragm 21 via passage 87 through the inside of the hollow member 41 and the diaphragm chamber 76. The fluid flow path continues from the transfer passage 75a to the fluid outlet 75b.

The method of sensing or transferring pressure proximate to the outlet of the regulator by use of the hollow member provides partial pressure compensation for the pressure drop between the downstream side of the valve seat and the regulator outlet. In other words it reduces the change in outlet port pressure for a change in flow through the regulator. This results in reduced pressure droop of the outlet pressure.

As illustrated, the stem of the hollow member 41 is circular in cross-section, but other cross-sections are contemplated. Also as illustrated, the passage 87 through the hollow member 41 is coaxial with the centreline axis of the hollow member 41, but other orientations of the passage through the hollow member are envisaged. The cross-sectional area of the passage 85 formed between the outside of the stem of the hollow member 41 and the transfer channel 75a can vary between the point at which flow enters the narrowed section passage and the point at which the flow exits the passage into the full cross section of the transfer passage.

The passage 85 cross section reduces in the direction of flow along the flow path by having a tapered outside profile of the stem of the hollow member 41 whilst installed in a cylindrical passage. In an alternative embodiment a hollow member with a cylindrical stem can be installed in a tapering transfer passage to provide a passage which gradually accelerates fluid as it flows through the passage formed between the stem of the hollow member and the transfer passage.

In an alternative arrangement both the transfer passage and the outside of the hollow stem can have a tapered portion to provide a passage which reduces in cross-section towards the downstream end of the hollow member.

In an alternative arrangement the cross-section of the passage between the outside of the stem of the hollow member and the transfer passage is substantially constant.

In other examples, the fluid connection from the gallery 74 to the start of the passage 85 past the hollow may be via a slot or aperture with a cross sectional area preferably equal to or larger than that of the cross-sectional area of the full transfer passage.

FIGS. 3a-3f show a further example of a pressure regulator.

The arrangement shown in FIGS. 3a-3f allows an even more compact construction than the example shown in FIGS. 2a-2b. This is achieved by disposing the hollow member 41 in a direction substantially perpendicular to the movement axis of the closure member 14 as opposed to disposing the hollow member 41 in a direction generally parallel to the movement axis of closure member 14 as shown in FIGS. 2a-2b.

The fluid path through the pressure regulator shown in FIGS. 3a-3f is substantially similar to that described with reference to FIGS. 2a-2b. The main differences being an additional transfer passage 97a, disposed on the fluid path between transfer passage 75a and fluid outlet 75b, additional transfer passages 99, 99*a* disposed on the fluid path between passage 87 and diaphragm chamber 76, and additional transfer passage 95 disposed on the fluid path between gallery 74 and passage 85. These additional transfer passages are included to allow for the disposal of the hollow member 41 in a direction substantially perpendicular to the movement axis of closure member 14. By arranging the hollow member 41 in this orientation, the size of the pressure regulator can be made smaller as there is no need to allow sufficient depth for the hollow member 41 to extend between gallery 74 and the fluid outlet 75*b*.

Figure 4:
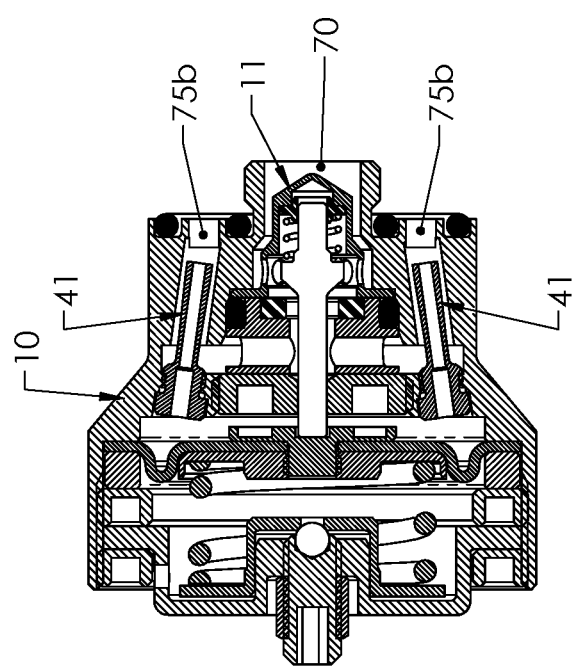
FIG. 4 shows a lengthwise cross-section through a pressure regulator.

FIG. 4 shows a pressure regulator according to another example. In this example, multiple fluid outlets 75*b* are provided, each having a corresponding hollow member 41. By providing the pressure regulator with more than one hollow member 41, the flow capacity of a regulator can be increased, unless or until the flow is limited by other limiting flow areas in the regulator flowpath.

The remainder of the structure and operation of the pressure regulator is the same as that described for FIG. 2*a*-2*b* except that the fluid outlet flow from the gallery 74 is divided between the plurality of outlet paths with the corresponding plurality of hollow members 41. In the present example, the plurality of fluid outlets 75*b* and corresponding plurality of hollow members are equally spaced around the axis of the pressure regulator to allow for a substantially symmetrical distribution of sensed pressures from the plurality of sensing positions downstream of the hollow members.

Figure 5:
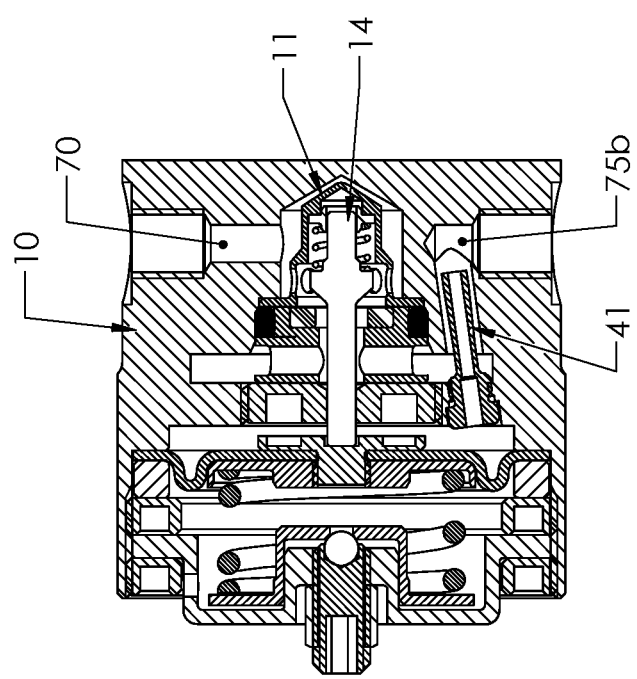
FIG. 5 shows a lengthwise cross-section through a pressure regulator.

FIG. 5 shows a pressure regulator according to a further alternative arrangement. The Figure shows an alternate arrangement where the fluid inlet and fluid outlet are substantially perpendicular to the movement axis of the closure member. In such an arrangement the deflection effect of closure member housing 11 is less pronounced than in the pressure regulator described with reference to FIGS. 1*a*-*c*. However, the closure member housing 11 will substantially prevent fluid impinging on the closure member in a direction parallel with the movement axis of the closure member.

In all of the examples shown in FIGS. 2 to 4 the pressure droop in the outlet pressure at location 75*b* in the regulators is reduced and the useable flow range is increased by the use of the hollow member and deflection member configuration.

For the regulator example shown in FIG. 5 the hollow member and deflection member configuration reduces the droop in outlet pressure and increases the useable flow range, with the hollow member providing the main contribution to the reduction in droop in outlet pressure.

The use of the hollow member configuration described, allows for a compact design of pressure regulator with reduced droop in outlet pressure with a high maximum fluid flow throughput, particularly, but not exclusively, when used in a regulator which has a deflection member configuration to partially shield the closure member as described for the first aspect of the invention.

In an alternate embodiment of the regulators shown in FIGS. 1-5 the valve closure member can be a ball operating in conjunction with a piston with said ball serving as the closure member acting on valve seat 17 and said piston being dimensioned to slidably operate in the bore of retainer 13 such that the load spring 23 can transmit force to the ball closure member via the diaphragm subassembly 55. In this configuration one end of said piston is in physical contact with the ball and the other end is in physical contact with the diaphragm subassembly 55.

An embodiment of the present invention is illustrated in FIGS. 6*a*-6*d*. The pressure regulator shown in FIGS. 6*a*-6*d* has a main body 10 into which the component parts of the pressure regulator are assembled much as for the arrangement shown with reference to FIGS. 1*a*-1*c*. The operation of the closure member housing 11, a valve seat housing 12, a retainer 13, a closure member 14, a bearing 15, a bias spring 16, a valve seat 17, diaphragm assembly 55, and adjuster 26 are similar to the corresponding arrangements described above with reference to FIGS. 1*a*-1*c*.

The main difference between the pressure regulator of the invention and the regulator of the earlier arrangements is that the closure member 14 has two valve elements: an upstream valve element and a downstream valve element.

The upstream and downstream valve elements of the closure member may be of a variety of shapes. In the example shown in FIGS. 6*a*, 6*b* and 6*d* the upstream valve element is a conical poppet type valve element and the downstream valve element is a ridge type element. Alternatively for example, the upstream valve element can be a can be a poppet type element with a curved portion and the downstream valve element can be a ridge with notches or flat portions. In the present example the aperture in the valve seat 17 and the bore in the valve seat housing 12 are depicted as separate elements. Alternatively the valve seat and valve seat housing aperture to provide openings 72 and 113 can be a single contiguous element with a constant or varying cross section.

As with the above arrangements shown in FIGS. 1*a*-1*c*, the operating fluid enters a fluid inlet at 70, is deflected by the closure member housing or deflection member 11 and passes between the annulus formed by the bore of main body 10 and the closure member housing 11. The fluid path enters into the chamber inside closure member housing 11 through radial holes or slots 71 in the closure member housing 11. When the pressure regulator is at least partially open, fluid passes through opening 72 provided by the valve seat 17 and the upstream valve element 14*a* of the closure member 14. When the pressure regulator is fully closed, for example when the set pressure is set to zero fluid outlet pressure, opening 72 is closed off by valve seat 17 and the upstream valve element 14*a* of closure member 14. After passing through the opening 72 the fluid path then passes through opening 113 provided by the aperture in valve seat housing 12 and the ridge 14*b* of the downstream valve element of closure member 14 in the following manner:—

(1) Where the closure member 14 is between 60% and 100% stroke (where 0% stroke is defined as the position when opening 72 is closed by upstream valve element 14*a*, and 100% stroke as the position when opening 72 is fully open), the downstream valve element 14*b* is partially or fully inside the aperture in the valve seat housing 12 which restricts but does not completely obstruct the fluid path through opening 113. This situation is depicted in FIG. 6*b*.

(2) Where the closure member 14 is between 0% and 60% stroke the downstream valve element 14*b* is clear of opening 113 such that the downstream valve element 14*b* does not restrict the fluid path through opening 113. This situation is depicted in FIG. 6*d*. The range of stroke positions where the downstream 14*b* restricts the fluid path through opening 113 can be selected for particular applications by varying the size, shape and position of ridge 14*b* and the size and position of the bore of valve seat housing 12. For some applications the lower boundary of this stroke range may instead of 60% be greater or lower. Possible example values include 80%, 70%, 65%, 55%, 50%. After passing through the opening 113 the fluid path emerges through radial holes or slots 73 disposed around the axis of the seat housing 12. The fluid flow path through the plurality of radial holes/slots 73 in the seat housing 12 flows into the gallery 74 and exits the gallery outlet 75. The pressure at the gallery outlet 75 is transferred to the diaphragm chamber 76 via the passage in orifice plug 31. Finally the fluid path passes to fluid outlet 75b through a transfer passage 75a.

A worked illustration of the example pressure regulator as shown with reference to FIGS. 6a-6d is given below where the load spring 23 has been pre-adjusted for a 2 bar regulated pressure at the fluid outlet 75b.

When zero pressure is applied to the fluid inlet 70 and the outlet port pressure is zero the closure member 14 is at 100% stroke (opening 72 is fully open).

If 5 bar pressure is applied to fluid inlet 70, the fluid will initially pass through opening 72 and the restricted opening 113 since the closure member 14 is initially at 100% stoke. As the pressure in the diaphragm chamber 76 increases the closure member 14 moves towards the left in the orientation shown in FIG. 6a and when it reaches the position just below 60% of stroke the downstream valve element 14b is no longer restricting the fluid path through opening 113. The pressure will then continue to increase in the diaphragm chamber 76 thus moving the closure member 14 further towards the left which increases the degree of restriction by the upstream valve element 14a of the fluid path though opening 72 whilst the opening 113 remains unrestricted. This will progress until a force balance is reached between the net load force acting on the diaphragm and the overall effect of the outlet fluid pressure acting on the diaphragm. This will occur at approximately the pre-adjusted pressure of 2 bar.

In the event of a large leak path in the diaphragm to the exterior via the vent aperture 100, which does not obstruct the movement of the diaphragm along the movement axis of the closure member, it is helpful to consider the flow paths and restrictions that exist in the regulator as shown in FIG. 6c. A1 is defined as the equivalent orifice area of opening 72, A2 as the equivalent orifice area of opening 113, A12 as the equivalent orifice area of A1 and A2 in series, A3 as the equivalent orifice area of a leak path in a leaking diaphragm 21 (a healthy diaphragm will have A3=0), A4 as the equivalent orifice area of vent hole 100 and A34 as the equivalent orifice area of A3 and A4 in series.

The leak path will pass through A1, A2, A3 and finally A4 to the exterior of the pressure regulator.

For reference three pressures are shown in the flow path schematic in FIG. 6c:—
P1: Fluid Inlet pressure
P2: Fluid Outlet pressure
Po: Exterior pressure In the event of a large leak path across the diaphragm 21 such that area A3 is approximately equal to or greater than 150% of area A4, the maximum outlet pressure 75b will be substantially determined by the exterior pressure plus the "pressure division" of the inlet pressure to exterior pressure drop across the restrictions A12 and A34.

As the pressure in the diaphragm chamber 76 drops, the closure member 14 will move to 60-100% stroke position (where the downstream valve element 14b restricts opening 113). In this position restriction A2 is the dominant restriction since A1 will be large in comparison with the restricted A2 and therefore A12 will be approximately equal to A2. Similarly as A3 is larger than A4, A34 is approximately equal to A4. Therefore the maximum pressure at fluid outlet 75b will be largely determined by the "pressure division" between A2 and A4.

This mode of operation for the regulator may be referred to as "Safe Mode" and provides a means of limiting fluid outlet pressure to a predetermined value at the fluid outlet in the event of the diaphragm having a leak path to the exterior that is larger than can be controlled or compensated for by a conventional regulator configuration having a closure member with only an "upstream" valve element.

For an example case where the diaphragm has damage that causes a leak path from the fluid outlet to the exterior via the vent aperture, and the downstream valve element of the closure member moves to be partially or fully inside the aperture in the valve seat housing, and no fluid is consumed at the fluid outlet 75b, where the fluid is air and where area A2 is taken as approximately 50% of area A4 (vent aperture equivalent orifice area), and the pressure at the fluid inlet 70 is set to 6 bar absolute, the exterior pressure is 1 bar absolute, then the pressure drop across A2 will be approximately 2.5 bar. Accordingly the maximum pressure at the fluid outlet 75b will be equal to the inlet pressure of 6 bar minus the 2.5 bar pressure drop across A2 i.e. =outlet pressure=6−2.5=3.5 bar absolute.

In the case where some fluid is consumed at the fluid outlet 75b, the pressure at the fluid outlet 75b would become lower than the 3.5 bar absolute pressure calculated above for the case with zero flow to the fluid outlet—thereby still providing an outlet pressure within the predetermined maximum pressure limit.

When the regulator is not operating in its "Safe Mode" it is operating in what may be referred to as "Normal mode", whereby the upstream valve element together with the seat in the valve seat housing, substantially regulates the fluid outlet pressure similar to the operation of a conventional regulator configuration.

The mode of operation of the regulator automatically changes from "Normal Mode" to "Safe Mode" when the net force acting on the diaphragm in a direction opposing the Load Spring force and parallel to the closure member axis, is below a predetermined value, wherein the net force is given by:

$$F_{NET} = [A_{DE} * (P_2 - P_3)] - [F_{LOAD,SPRG} - F_{BIAS,SPRG}]$$

where: $F_{NET}$ is the Net Force acting on diaphragm: +ve direction opposes the force applied by the Load Spring;
$P_2$ is the Outlet pressure (absolute);
$P_3$ is the Load Spring chamber pressure (absolute);
$F_{LOAD,SPRG}$ is the force applied to the diaphragm by the Load Spring;
$F_{BIAS,SPRG}$ is the force applied to the diaphragm by the Bias Spring via the closure member: and
$A_{DE}$ is the Effective area of the diaphragm on which the Outlet and Exterior pressures act in the direction parallel to the axis of the closure member.

The value of $A_{DE}$ is at a maximum when the diaphragm is undamaged with zero fluid leakage through the diaphragm from the outlet port to the exterior via the Load Spring chamber and Vent aperture. The value of $A_{DE}$ is at a reduced value if the diaphragm is damaged with a leak path through from the fluid outlet port to the exterior, wherein the larger the leak path area A3, the smaller the effective diaphragm area $A_{DE}$. The load spring chamber pressure $P_3$ depends substantially on the size of the leak path area A3 in the diaphragm relative to the sizes of the Vent aperture area A4 and the area A2 between the downstream valve element and the aperture in the valve seat housing.

The equivalent orifice areas A2 and A4 can be designed to produce a desired "pressure division" between the pressure at the fluid inlet 70 and the pressure at the exterior to limit pressure at the regulator fluid outlet. 75b for the "Safe Mode" of operation This can be achieved by varying the size, shape of downstream valve element 14*b* and the aperture of valve seat housing 12 for area A2. The vent aperture area A4 is dimensioned to give required area with the minimum allowable area being preferably equal to the area of an orifice that would give a fluid pressure drop of 0.5 bar or less with 100% rated regulator flow passing through said orifice.

By appropriate dimensioning of components to obtain the areas A2 and A4 needed for the required inlet-outlet-exterior pressure division, the maximum pressure delivered to the fluid outlet 75*b* in an emergency situation when a leak path in diaphragm occurs, can be preset as a proportion of the inlet to exterior pressure difference above the exterior pressure. The proportion of the inlet to exterior pressure difference above the exterior pressure delivered to the fluid outlet 75*b* can be set to a range of values. In some examples, the value could be approximately 10%, 20%, 30%, or 40%.

In some examples, for gaseous fluids, in the "Safe Mode" of regulator operation, the metering area of the restriction defined by the path between the ridge of the downstream valve element of the closure member and the aperture in the valve seat housing and the effective fluid metering area of the vent aperture can be determined empirically or by iterative calculation using a formula generally of the form:

$$P_2 = P_0 + \left[\frac{P_1}{P_0}\right] * \left[\frac{A_2}{A_4}\right]^2 * K$$

Where $P_1$ is Inlet pressure (absolute)
$P_2$ is Outlet pressure (absolute)
$P_0$ is Exterior pressure (absolute)
$A_2$ is Equivalent orifice area of the path between the ridge of the downstream valve element of the closure member and the aperture in the seat housing.
$A_4$ is Equivalent orifice area of the vent aperture.
K is an overall coefficient that is dependent on the properties and temperature of the fluid and the magnitude of fluid flow.

In contrast, in the event of a large leak path through a diaphragm 21 as described above, in a pressure regulator which has no downstream valve element 14*b*, the closure member 14 would move such that opening 72 was open to an extent such that the pressure delivered to the fluid outlet 75*b* would be significantly above the set or desired outlet pressure.

Such pressures may damage equipment connected to the fluid outlet 75*b* and accordingly a pressure regulator as shown in FIGS. 6*a*-6*d* allows such a risk of damage to be reduced because it can automatically change its mode of operation from "Normal Mode" to "Safe Mode". Furthermore a pressure regulator as shown in FIGS. 6*a*-6*d* allows the leak path to the exterior of the pressure regulator to be reduced.

In the event of leak paths through the diaphragm to the exterior via the vent aperture that are smaller than approximately 50% of the vent aperture area A4, the regulator will behave substantially as a healthy diaphragm—with diaphragm movement causing the upstream valve element of the closure member to regulate the outlet pressure—working in the "Normal Mode" of operation.

For leak path areas through the diaphragm having an area that is between the "Large" and "Small" leak path sizes described above, the mode of outlet pressure regulation may transition between the conditions described for small and large leak paths, i.e., between the "Normal" and "Safe" Modes of operation.

The above described concepts for producing a compact high throughput pressure regulator can be adapted to produce a pressure regulator with a variety of overall dimensions and flow capabilities. The above described concepts may also be used to provide a pressure regulating valve for the second stage of a two stage pressure regulator valve. However, it will also be appreciated that although the techniques described herein are suited to the provision of a compact miniature pressure regulator, such techniques may also be employed to make compact larger scale pressure regulators.

The above-described concepts for producing a compact high throughput pressure regulator can be adapted to produce a pressure regulator of either the relieving type (where excess downstream pressure is vented to the exterior of the pressure regulator) or the non-relieving type (where excess downstream pressure is not vented to the exterior of the pressure regulator).

Although various components discussed above are described as being assembled in a particular order or as being held in place by particular structures, a pressure regulator consistent with the present teachings can be constructed using a variety of orders and directions of assembly for the various components and a variety of securing elements and mechanisms can be deployed. As just one example, it will be apparent from the figures that the receiving structure formed in the main body is illustrated in such manner as to indicate that this receiving structure could be manufactured by milling the receiving structure from the main body with the cross-section tending to generally reduce along the axis of the receiving structure.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. The embodiments described above are given by way of example only and modifications will be apparent to persons skilled in the art without departing from the scope of the invention as defined by the appended claims.

What is claimed is:

1. A pressure regulator, said pressure regulator comprising a housing containing a channel arranged to communicate a fluid from a fluid inlet to a fluid outlet, said channel comprising a valve seat housing, a valve seat and closure member with said closure member operable with the valve seat and valve seat housing to control flow through the channel;
   wherein the housing comprises a resilient diaphragm in fluid communication with the fluid and in physical communication with the closure member such that the diaphragm is operable to deform in response to a change in pressure of the fluid and such that deformation of the diaphragm causes the closure member to change position;
   wherein the section of the diaphragm in fluid communication with the channel is via a passage;
   wherein the section of the diaphragm not in fluid communication with the channel, is in fluid communication with the exterior of the regulator via a vent aperture and;

wherein the closure member comprises an upstream valve element and downstream valve element, wherein the downstream valve element is a taper terminating in a ridge operable with an aperture in the valve seat housing to at least partially control fluid flow through the aperture in the valve seat housing, wherein the closure member is configured so that the aperture remains at least partially open for all positions of the closure member, wherein said ridge of the closure member enters said aperture in the valve seat housing when the upstream valve element of the closure member is at or between the fully open position and a predetermined partially open position with the valve seat, to provide a restriction to fluid flow but not to fully obstruct flow;

wherein, in the event of fluid leakage flow above a predetermined magnitude through the diaphragm to the exterior of the regulator via the vent aperture, the radial opening between the downstream valve element of the closure member and the aperture in the valve seat housing decreases until the ridge enters the aperture while the radial opening between the upstream valve element and the valve seat increases, and the maximum pressure delivered to the fluid outlet is set to the exterior pressure plus a portion of the inlet to the exterior pressure difference, the said portion being determined by a predetermined calculation using;

the inlet pressure;

the exterior pressure;

the effective fluid metering area of the restriction defined by the path between the ridge of the downstream valve element of the closure member and the aperture in the valve seat housing when the ridge enters the said aperture and;

the effective fluid metering area of the vent aperture in series with the passage; and wherein the downstream valve element of the closure member, the aperture in the valve seat housing, the vent aperture and cross sectional area of the passage are dimensioned to predetermine a maximum limit of the fluid outlet pressure for a predefined inlet pressure and a predefined exterior pressure, for the situation of fluid leakage flow above a predetermined magnitude through the diaphragm to the exterior of the regulator via the passage and the vent aperture.

2. A pressure regulator as in claim 1, wherein the said upstream valve element being operable with the valve seat to obstruct fluid flow in the fully closed position.

3. A pressure regulator as in claim 1, wherein the portion of the inlet to the exterior pressure difference is set to one of 10%, 20%, 30%, or 40% of the inlet to exterior pressure difference.

4. A pressure regulator as in claim 1, wherein the portion of the inlet to exterior pressure difference is determined iteratively using a formula of the form:—

$$P_2 = P_0 + \left[\frac{P_1}{P_0}\right] * \left[\frac{A_2}{A_4}\right]^2 * K$$

Where $P_1$ is Inlet pressure (absolute)

$P_2$ is Outlet pressure (absolute)

$P_0$ is Exterior pressure (absolute)

$A_2$ is Equivalent orifice area of the path between the ridge of the downstream valve element of the closure member and the aperture in the valve seat housing $A_4$ is Equivalent orifice area of the vent aperture in series with the passage K is an overall coefficient that is dependent on the properties and temperature of the fluid and the magnitude of fluid flow.

5. A pressure regulator as in claim 1, wherein the passage is an orifice.

6. A pressure regulator as in claim 1, wherein the regulator comprises a deflection member located in the channel and arranged to deflect fluid flowing in the channel such that the closure member is shielded to substantially prevent fluid, that is flowing parallel to the movement axis of the closure member, and in a downstream direction, from impinging on the portion of the closure member that is upstream of the valve seat.

7. A pressure regulator as in claim 6, wherein the deflection member deflects fluid around the closure member such that the fluid is directed to the valve seat in a symmetric manner in a plane substantially perpendicular to the movement axis of the closure member.

8. A pressure regulator as in claim 1, wherein a hollow member is located in the channel such that the stem of said hollow member defines a narrow path between the channel and the outside of said stem proximate to the fluid outlet such that fluid passing through the channel is communicated from the fluid inlet to the fluid outlet via said narrow path such that the pressure of the fluid emerging from said narrow path into the channel is communicated to the diaphragm via the inside of the hollow member.

9. A pressure regulator as in claim 8, wherein the regulator comprises a diaphragm chamber which abuts the diaphragm and wherein the inside of the hollow member is operable to communicate the fluid directly from the channel through a wall of the channel to the diaphragm chamber.

10. A pressure regulator as in claim 1, wherein the closure member comprises a ball and a piston, wherein said piston is in physical communication with the diaphragm and said ball, such that said ball is operable with the valve seat to obstruct flow through the channel in the closed position.

11. A pressure regulator as in claim 1, wherein the diaphragm is urged by an urging means to urge the closure member towards a position that provides an opening between the closure member and the valve seat.

12. A pressure regulator as in claim 11, wherein the urging means comprises a load spring and wherein the regulator comprises an adjustment mechanism which is operable to adjust the compression of said load spring, such that the force acting on the diaphragm can be varied.

13. A pressure regulator as in claim 12, wherein the ridge of the downstream valve element of the closure member enters the aperture in the valve seat housing to provide restriction to fluid flow when a net force acting on the diaphragm in the direction opposing the load spring force and parallel to the closure member axis, is below a predetermined value, wherein the net force is given by:

$$F_{NET} = [A_{DE} * (P_2 P_3)] - [F_{LOAD,SPRG} - F_{BIAS,SPRG}]$$

where: $F_{NET}$ is the net force acting on diaphragm;

$P_2$ is the outlet pressure (absolute);

$P_3$ is the load spring chamber pressure (absolute);

$F_{LOAD,SPRG}$ is the force applied to the diaphragm by the load spring;

$F_{BIAS,SPRG}$ is the force applied to the diaphragm by a bias spring via the closure member in a direction that opposes the load spring;

$A_{DE}$ is the effective area of the diaphragm on which the outlet and exterior pressures act in the direction parallel to the axis of the closure member wherein the value of $A_{DE}$ is at a maximum when the diaphragm is undamaged with zero fluid leakage through from the outlet port to the exterior via the passage, load spring chamber and vent aperture, or wherein the value of $A_{DE}$ is at a reduced value when the diaphragm is damaged with a leak path through from the fluid outlet port to the exterior, wherein the larger the leak path through the diaphragm to the exterior via the passage, load spring chamber and vent aperture, the lower the value of $A_{DE}$.

14. A pressure regulator as in claim 13, wherein the upstream valve element of the closure member is in the fully closed position when the fluid outlet pressure is above a predetermined value.

15. A pressure regulator as in claim 11, wherein said biasing means comprises a pressurised control fluid which acts on a section of the diaphragm which is not in fluid communication with the channel.

16. A pressure regulator as in claim 13, wherein the pressure of the pressurised control fluid can be adjusted to vary the force of the pressurised control fluid acting on the diaphragm.

17. A pressure regulator, said pressure regulator comprising a housing containing a channel arranged to communicate a fluid from a fluid inlet to a fluid outlet, said channel comprising a valve seat housing, a valve seat and closure member with said closure member operable with the valve seat and valve seat housing to control flow through the channel;

wherein the housing comprises a resilient diaphragm in fluid communication with the fluid and in physical communication with the closure member such that the diaphragm is operable to deform in response to a change in pressure of the fluid and such that deformation of the diaphragm causes the closure member to change position, and;

wherein the section of the diaphragm not in fluid communication with the channel, is in fluid communication with the exterior of the regulator via a vent aperture and;

wherein the section of the diaphragm in fluid communication with the channel is via a passage;

wherein the closure member comprises an upstream valve element and downstream valve element, wherein the downstream valve element is a taper terminating in a ridge operable with an aperture in the valve seat housing to at least partially control fluid flow, the closure member sized to fit into but not fully obstruct the aperture in the valve seat housing, wherein the aperture remains at least partially open for all positions of the closure member, wherein said ridge of the closure member enters said aperture in the valve seat housing when the upstream valve element of the closure member is at or between the fully open position and a predetermined partially open position with the valve seat, to provide a restriction to fluid flow but not to fully obstruct flow;

wherein, in the event of fluid leakage flow above a predetermined magnitude through the diaphragm to the exterior of the regulator via the vent aperture, the radial opening between the downstream valve element of the closure member and the aperture in the valve seat housing decreases until the ridge enters the aperture, while the radial opening between the upstream valve element and the valve seat increases and the maximum pressure delivered to the fluid outlet is set to the exterior pressure plus a portion of the inlet to the exterior pressure difference, the said portion being determined by a predetermined calculation using;

$$P_2 = P_0 + \left[\frac{P_1}{P_0}\right] * \left[\frac{A_2}{A_4}\right]^2 * K$$

where $P_1$ is the inlet pressure (absolute);
$P_2$ is the outlet pressure (absolute);
$P_0$ is the exterior pressure (absolute);
$A_2$ is an equivalent orifice area of the path between the ridge of the downstream valve element of the closure member and the aperture in the valve seat housing;
$A_4$ is an equivalent orifice area of the vent aperture in series with the passage; and
K is an overall coefficient that is dependent on properties and temperature of the fluid and a magnitude of fluid flow; and wherein the downstream valve element of the closure member, the aperture in the valve seat housing, the vent aperture and a cross sectional area of the passage are dimensioned to predetermine a maximum limit of the fluid outlet pressure for a predefined inlet pressure and a predefined exterior pressure, for the situation of fluid leakage flow above a predetermined magnitude through the diaphragm to the exterior of the regulator via the passage and the vent aperture.

* * * * *